Nov. 24, 1959     R. R. GREENWOOD     2,914,026
ANIMAL HOLDING APPARATUS
Filed Dec. 23, 1957
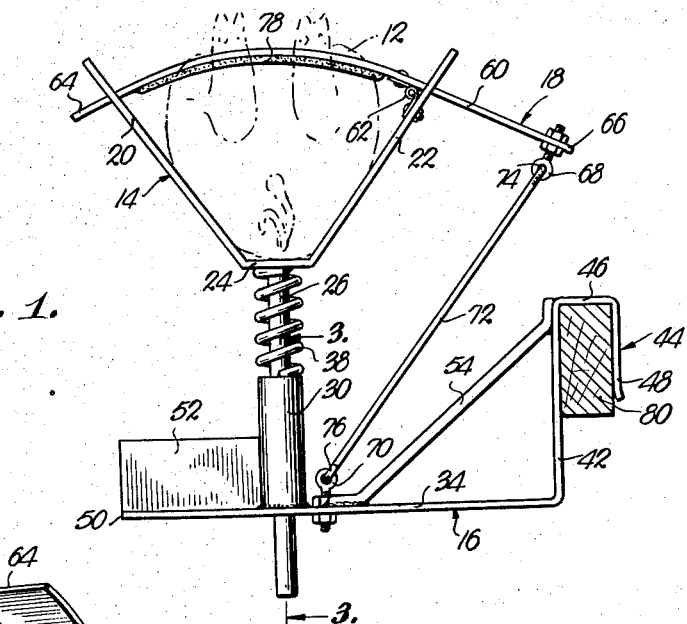
Fig. 1.
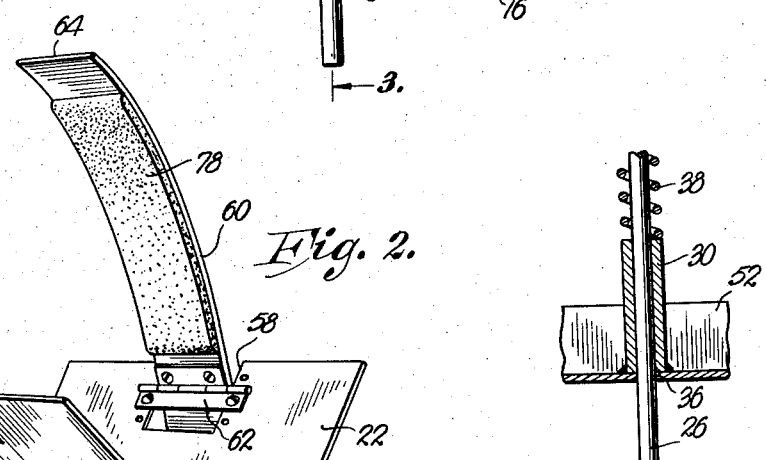
Fig. 2.
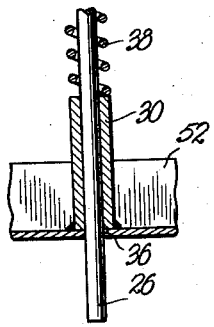
Fig. 3.
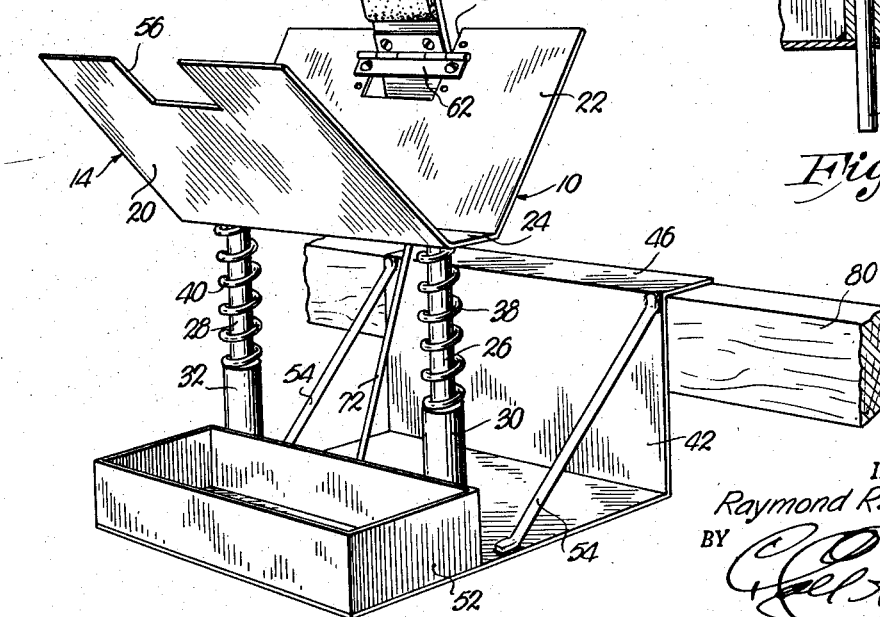
INVENTOR.
Raymond R. Greenwood
BY
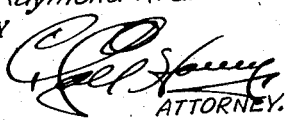
ATTORNEY.

United States Patent Office 2,914,026
Patented Nov. 24, 1959

2,914,026

ANIMAL HOLDING APPARATUS

Raymond R. Greenwood, Blythedale, Mo.

Application December 23, 1957, Serial No. 704,387

9 Claims. (Cl. 119—103)

This invention relates to a clamping device and, more particularly, to apparatus for holding small animals in the nature of pigs or the like while certain medical operations are being performed on the same, and which would normally require the person performing the operation to hold the animal while at the same time attempting to carry out the operation.

Heretofore, the castration of small animals such as pigs has required that at least two persons participate in the operation, inasmuch as it was necessary for one person to hold the animal while the other person operated the instruments. Manifestly, this procedure was expensive, time consuming and many times impractical.

It is, therefore, the most important object of this invention to provide apparatus for holding animals such as pigs in a readily accessible position so that operations in the nature of castration may be carried out by one person in a minimum of time and without in any manner endangering the animal during such operation.

Another important object of this invention is to provide apparatus for holding small animals during medical operations which includes a vertically shiftable platform adapted to support the animal in a readily accessible position, and a clamp swingably mounted on the platform and movable to a position clamping the animal on the platform responsive to shifting movement of the platform, whereby the weight of the animal on the platform is utilized to maintain the clamp in position against the animal.

Another important object of this invention relates to provision of apparatus as described wherein the clamp swingably mounted on the platform is always maintained in clamping engagement with the animal on the platform so long as the animal remains disposed on the platform, by virtue of the provision of a link interconnecting the clamp and a base upon which the platform is reciprocably mounted.

Another important object of the invention is the provision of spring means interposed between the vertically shiftable platform and the base upon which the platform is reciprocably mounted, to the end that the platform is biased toward the uppermost end of its path of travel to thereby maintain the clamp in an open position so long as the platform remains at the upper end of its path of travel, and thereby permit an animal to be readily inserted into position upon the platform and beneath the swingable clamp.

Other important objects of the invention relate to the provision of a substantially V-shaped platform so that the pig or other small animal is firmly held in a readily accessible position; to the provision of resilient means secured to the under face of that portion of the clamp normally overlying the platform and which engages the pig to thereby prevent the same from squirming off of the platform during the operation; to the provision of hook means on the base of the apparatus so that the same may be quickly positioned upon a wall or the like without permanent means of attachment being necessary; and to the provision of a relatively inexpensive animal holding device which has few movable parts, is of rugged construction and therefore, not liable to breakdown, and of relatively small dimensions so that the same may be stored in a small space.

In the drawing:

Figure 1 is an end elevational view of animal holding apparatus embodying the concepts of the present invention and illustrating the same mounted in position on a suitable support, with a small animal, such as a pig, shown in phantom and disposed upon the platform of the apparatus;

Fig. 2 is a perspective view of the apparatus referred to in Fig. 1 and showing the same in its normal position when the pig has been removed from the platform and which thereby causes the latter to move toward the uppermost end of its path of travel, thus opening the clamp; and Fig. 3 is a fragmentary, vertical, cross-sectional view taken on the line 3—3 of Fig. 1.

Apparatus 10 is especially adapted for permitting one man to operate on and, more particularly, castrate small pigs 12 or other similar animals, and includes as basic components a platform 14 reciprocably carried by a base 16, and clamp means 18 swingably mounted on platform 14 and secured to base 16.

Platform 14 is preferably substantially V-shaped in transverse cross-section and therefore includes a pair of outwardly diverging rectangular sides 20 and 22 which are interconnected at their lowermost margins by a normally horizontal base panel 24. A pair of parallel rods 26 and 28 are suitably secured to and depend from the underside of panel 24 and are reciprocably received within corresponding cylindrical bearings 30 and 32 welded on the upper face of polygonal, horizontal leg 34 of base 16 in alignment with respective openings 36 in leg 34, and which also receive rods 26 and 28. As clearly shown in Fig. 1, rods 26 and 28 are substantially longer than bearings 30 and 32 so that the same extend outwardly from both ends of corresponding bearings 30 and 32. Coil springs 38 and 40 are preferably provided around each of the rods 26 and 28 and are interposed between the lower face of panel 24 and the upper ends of corresponding bearings 30 and 32 for biasing platform 14 toward the uppermost end of its path of travel.

Base 16 is substantially L-shaped in transverse cross-section and therefore includes a polygonal, vertical leg 42 disposed perpendicularly to leg 34, and a substantially L-shaped hook broadly designated 44 is joined to leg 42 by virtue of section 46 of hook 44 being integral with the uppermost margin of leg 42, while section 48 of hook 44 depends from and is integral with the outermost margin of section 46 remote from leg 42. It is noted that section 48 preferably extends the entire length of leg 42 but is of substantially less width than leg 42.

Bearings 30 and 32 are preferably positioned intermediate leg 42 and outer marginal edge 50 of leg 34 and in this manner, a rectangular equipment box 52 is secured to the upper face of leg 34 between edge 50 and bearings 30 and 32. Angularly disposed bracing rods 54 interconnect legs 34 and 42 to impart rigidity to base 16.

Sides 20 and 22 of platform 14 are preferably provided with rectangular slots 56 and 58 respectively which extend inwardly from the upper marginal edges of sides 20 and 22, and an elongated, arcuate clamp 60 is pivotally mounted intermediate its ends on side 22 within slot 58 by virtue of suitable hinge means 62 secured to the under face of clamp 60 and adjustably mounted on the inner surface of side 22 across slot 58. Clamp 60 is of sufficient length that the end 64 thereof extends across platform 14 and beyond side 20 so that upon swinging movement of end 64 to the lowermost point of its path of travel, the latter is disposed within slot 56. The opposite end 66 of clamp 60 is provided with an eye bolt 68 secured to and depending from the same, while a similar eye bolt 70 is attached to and extends upwardly from the upper face of leg 34 adjacent to an imaginary line between bearings 30 and 32. An elongated link 72 interconnects clamp 60 and base 16 by virtue of eyelets 74 and 76 pivotally disposed within eye bolts 68 and 70 respectively. It is to be noted that link 72 is of sufficient length that when platform 14 is at the uppermost end of its path of travel, as illustrated in Fig. 2, clamp 60 is thereby swung to its open position, as also clearly shown in this figure. A rectangular piece of flexible material 78 is secured to the concave underside of clamp 60 which normally overlies platform 14.

In operation, apparatus 10 is adapted to be quickly and easily mounted in an operable position upon an elongated, horizontally disposed member 80 in the nature of a 2" x 4". Thereupon, a small pig 12 or other similar animal may be easily placed in position on platform 14 by virtue of the fact that clamp 60 has been moved to its open position, as shown in Fig. 2, this being true because of the link 72 connecting end 66 of clamp 60 with leg 34 of base 16, link 72 being of predetermined length to assure that upon movement of platform 14 to the uppermost end of its path of travel under the influence of springs 38 and 40, clamp 60 is swung to an open position.

Animal 12 is normally placed upon platform 14 on its back with its feet extending upwardly, as shown in Fig. 1, and it can be appreciated that as the weight of the pig 12 on platform 14 moves the latter downwardly against the action of springs 38 and 40, clamp 60 is likewise swung about the axis of hinge 62 to move into engagement with the exposed belly of animal 12. Link 72 again operates to cause clamp 60 to be swung downwardly toward paltform 14 as the latter is shifted downwardly under the weight of pig 12 and, as the outermost end 64 of clamp 60 is received within slot 56 of side 20, resilient or flexible material 78 on clamp 60 engages animal 12. Clamp 60 will remain in engagement with animal 12 so long as the weight of the latter remains on platform 14 and therefore, the castration operation may be readily performed.

After completion of the operation, removal of the animal may be quickly effected by moving the same upwardly to relieve the pressure on platform 14, whereupon springs 38 and 40 automatically bias platform 14 upwardly toward the uppermost end of its path of travel which thereby also opens clamp 60 to clear the animal as the same is removed from platform 14.

It is to be pointed out that, although in the preferred form of apparatus 10 springs 38 and 40 are disposed upon rods 26 and 28 to automatically open clamp 60 upon removal of animal 12 from platform 14, such springs may be eliminated if necessary and the operation of apparatus 10 will be identical with the exception that, after an animal has been removed from platform 14, it will be necessary for the person to grasp the outer end 64 of clamp 60 and swing the same upwardly to permit another animal 12 to be placed upon platform 14.

Having thus described the invention what is claimed as new and desired to be secured by Letters Patent is:

1. In animal holding apparatus, a base; a substantially V-shaped platform shiftably mounted on said plate and movable along a substantially vertical path of travel, said platform being adapted to support the animal in an accessible position; spring means interposed between said platform and the base for biasing the platform toward the uppermost end of its path of travel; an elongated clamp swingably mounted intermediate its ends on said platform; and an elongated rod connected to the end of said clamp remote from said platform and to the base, said clamp being swingable from normally open disposition to a location extending across the upper open portion of the platform and firmly clamping the animal in said position responsive to vertical shifting of the platform toward the lower end of its path of travel under the weight of the animal and against the action of said spring means.

2. In animal holding appartus, a substantially L-shaped plate provided with a horizontal leg; an upwardly facing V-shaped platform having a pair of elongated, inwardly converging sides; a pair of elongated, spaced, parallel bars depending from the underside of said platform and reciprocably carried by said leg of the plate, said platform and the bars being shiftable along a substantially vertical path of travel, the platform being adapted to support the animal in an accessible position; an elongated clamp swingably mounted intermediate its ends on the upper margin of one of said sides of the platform, the inner end of said clamp being movable into transversely overlying relationship to the platform; and an elongated rod, one end of the rod being pivotally connected to the outer end of said clamp and the other end of the rod being pivotally coupled with said leg of the plate, said clamp being swingable from normally open disposition to a location extending across the upper open portion of the platform and firmly clamping the animal in said position responsive to vertical shifting of the platform toward the lower end of its path of travel under the weight of the animal.

3. In animal holding apparatus, a substantially L-shaped base plate provided with a horizontal leg; an upwardly facing V-shaped platform having a pair of elongated, inwardly converging sides; a pair of elongated, spaced, parallel bars depending from the underside of said platform and reciprocably carried by said leg of the plate, said platform and the bars being shiftable along a substantially vertical path of travel, the platform being adapted to support the animal in an accessible position; a coil spring surrounding each bar respectively and interposed between the platform and said leg of the plate; an elongated clamp swingably mounted intermediate its ends on the upper margin of one of said sides of the platform, the inner end of said clamp being movable into transversely overlying relationship to the platform; and an elongated rod, one end of the rod being pivotally connected to the outer end of said clamp and the other end of the rod being pivotally coupled with said leg of the plate, said clamp being swingable to a location clamping the animal in said position responsive to vertical shifting of the platform toward the lower end of its path of travel under the weight of the animal and against the action of said coil springs.

4. Apparatus as set forth in claim 3 wherein is provided bearings on the upper face of said leg of the plate receiving each of said bars respectively. the lower end of each of the coil springs engaging the uppermost end of corresponding bearings.

5. Apparatus as set forth in claim 4 wherein said plate is provided with a substantially vertical leg, said vertical leg having an elongated hook on the upper edge thereof.

6. Apparatus as set forth in claim 5 wherein is provided resilient material on the under face of said inner end of the clamp and adapted to engage the animal.

7. In animal holding apparatus, a base; a trough-like platform mounted on said base for vertical shifting movement relative thereto and adapted to support an animal in an accessible position; clamp means swingably connected to said platform; and means interconnecting the base and said clamp means for swinging the latter from normally open disposition when no weight is on the platform, to a location extending across the upper open portion of the platform and firmly clamping the animal, in response to vertical shifting movement of the platform under the weight of the animal.

8. Animal holding apparatus as set forth in claim 7 wherein said means causes the clamp means to be swung through an arc directly proportional to the weight of the animal.

9. Animal holding apparatus as set forth in claim 8 wherein is provided spring means interposed between the base and said platform for biasing the latter toward the upper end of its path of travel.

References Cited in the file of this patent

UNITED STATES PATENTS

| | | |
|---|---|---|
| 1,404,173 | Barnard | Jan. 17, 1922 |
| 2,688,949 | Butts | Sept. 14, 1954 |